United States Patent [19]
Demiddeleer et al.

[11] Patent Number: 5,334,568
[45] Date of Patent: Aug. 2, 1994

[54] CATALYTIC SOLID FOR USE IN THE POLYMERIZATION OF ALPHA-OLEFINES, PROCESS FOR PREPARING IT AND PROCESS FOR THE POLYMERIZATION OF ALPHA-OLEFINES IN THE PRESENCE OF A CATALYST SYSTEM CONTAINING THIS SOLID

[75] Inventors: Léopold Demiddeleer, Sterrebeek; Yvan Kempeneer, Erps-Kwerps; Laurence Desvachez, Brussels, all of Belgium

[73] Assignee: Solvay (Société Anonyme), Brussels, Belgium

[21] Appl. No.: 711,069

[22] Filed: Jun. 6, 1991

Related U.S. Application Data

[62] Division of Ser. No. 313,731, Feb. 22, 1989, Pat. No. 5,034,484.

[30] Foreign Application Priority Data

Feb. 22, 1988 [FR] France .................. 88 02200

[51] Int. Cl.$^5$ .................. B01J 31/00; B01J 37/00
[52] U.S. Cl. .................. 502/119; 502/104; 502/125; 502/126; 502/134; 526/115; 526/114; 526/116
[58] Field of Search ............ 502/104, 119, 125, 126, 502/134

[56] References Cited

U.S. PATENT DOCUMENTS

| | | | |
|---|---|---|---|
| 4,260,723 | 4/1981 | Harada et al. | 502/104 X |
| 4,296,223 | 10/1981 | Berger | 502/134 X |
| 4,399,055 | 8/1983 | Matsuura et al. | 502/119 |
| 4,643,986 | 2/1987 | Morinaga et al. | 502/104 |
| 5,034,484 | 7/1991 | Demiddeleer et al. | 502/125 X |

*Primary Examiner*—Asok Pal
*Attorney, Agent, or Firm*—Spencer, Frank & Schneider

[57] ABSTRACT

The invention concerns:
a catalytic solid containing magnesium, a halogen, titanium and silicon, this catalytic solid also containing aluminium and being microporous;
a process for preparing this catalytic solid;
use of this catalytic solid for polymerising alpha-olefines.

30 Claims, No Drawings

CATALYTIC SOLID FOR USE IN THE POLYMERIZATION OF ALPHA-OLEFINES, PROCESS FOR PREPARING IT AND PROCESS FOR THE POLYMERIZATION OF ALPHA-OLEFINES IN THE PRESENCE OF A CATALYST SYSTEM CONTAINING THIS SOLID

CROSS-REFERENCE TO RELATED APPLICATION

This application is a division of application No. 07/313,731 filed Feb. 22, 1989, and now U.S. Pat. No. 5,034,484 and incorporated herein by reference.

The present invention concerns a catalytic solid for use in the polymerisation of alpha-olefines. It also concerns a process for the preparation of this solid and a process for polymerising alpha-olefines in the presence of a catalyst system containing this solid.

The use, in the low pressure polymerisation of olefines, of catalyst systems containing a transition metal compound and an organometallic compound, is known.

Through Patents BE-A-791676 and 799977 (SOLVAY & Cie), superactive catalyst systems are also known, one of whose constituents is obtained, in particular, by reaction between an organic oxygenated compound or a magnesium dihalide and an oxygenated organotitanium compound, such as the tetrabutylate, so as to obtain a solution to which a hydrocarbylaluminium halide, such as an alkylaluminium dichloride, is then added under such conditions as to obtain a solid complex.

Although the activity and the productivity of these catalyst systems are very high, they have the drawback of not always allowing the morphology of the polymer to be easily controlled, when polymerisation is carried out in suspension in a hydrocarbon diluent.

Through the U.S. Pat. No. 4,399,055 (MITSUBISHI PETROCHEMICAL), solid catalyst components obtained from magnesium halide-based supports having a particular texture are also known.

These supports have a low specific surface area and are prepared by reaction between magnesium halides, esters of (poly)titanic acid(s) and polysiloxanes. The solid catalytic components are prepared by bringing these supports into contact with at least one compound selected among liquid halogenated titanium compounds, halogenated silicon compounds and polysiloxanes. Catalytic components prepared in this way may be used, together with a conventional organometallic co-catalyst, for polymerising alpha-olefines to polymers having a good morphology.

The use of catalyst systems constituted in this way however has drawbacks: their activity, that is to say the weight of polyolefine which may be obtained per unit weight of titanium present in the solid catalyst component, is insufficient; moreover, this activity is manifested only when the solid catalyst component has been present in the polymerisation medium for a certain time—called "induction period". This induction period, during which the catalyst system generates only low molecular weight oligomers, products whose presence moreover is a nuisance, can last from 30 minutes to several hours, depending on the type of polymerisation process. This is obviously unacceptable on an industrial scale for economic reasons.

The aim of the present invention is hence to provide superactive catalytic solids, whose activity is not inhibited by any induction period and which enable polyolefines having good granulometry to be easily obtained.

To this effect the present invention concerns a catalytic solid containing magnesium, a halogen, titanium and silicon, this catalytic solid furthermore containing aluminium and being microporous.

By microporous catalytic solid in the sense of the present invention, is meant solids containing the above-mentioned elements and of which a fraction of at least 50% of the BET porosity (defined below) is developed in pores of radius less than 50 Angströms (Å) ($5.10^{-9}$ m).

The fraction of porosity ($f_p$) developed in pores of radius less than 50 Å is estimated by examination of the catalytic solid using the nitrogen adsorption method (BET-method; British Standard BS4359/1), which enables Application of this method also enables the distribution of pore volume in relation to radii to be determined for pores of radius less than 200 Å.

In general, the $f_p$ of the catalytic solid according to the invention is such that more than 60% of its specific surface area is developed in pores of radii less than 50 Å. Preferably, the $f_p$ of this solid is such that more than 75% of its specific surface area is developed in pores of radii less than 30 Å. In the most favourable cases, the $f_p$ of this solid is such that at least 85% of its specific surface area is developed in pores of radii less than 30 Å.

In this zone in which the pore radii of the catalytic solids according to the invention are less than 200 Å, it is also observed that at least 50% of the pore volume is confined in pores of radii less than 30 Å. Preferably, at least 60% of the pore volume corresponding to this zone of pore radii is confined in pores of radii less than 30 Å.

In the most favourable cases, up to 60% of the pore volume corresponding to this zone of pore radii is confined in pores of radii less than 20 Å.

As a result of their extremely high microporosity, the catalytic solids according to the invention exhibit an equally high specific surface area; in general, this specific surface area is greater than 100 m²/g preferably greater than 150 m²/g. The specific surface area of the catalytic solids which have the highest microporosity may reach and exceed 250 m²/g. For its part, the pore volume in these solids, for pores of radii less than 200 Å, is greater than 0.10 ml/g, preferably greater than 0.15 ml/g. In the best cases, it can exceed 0.20 ml/g and even reach 0.40 ml/g. The total pore volume in these solids, estimated by the conjugate methods of nitrogen adsorption and mercury penetration, is greater than 0.5 ml/g and preferably greater than 0.8 ml/g. In the best cases it can reach about 1.2 ml/g.

The microporous catalytic solids according to the invention are prepared from a magnesium halide (M) which invention are prepared from a magnesium halide (M) which provides the magnesium and at least a part of the halogen in their composition.

By magnesium halide (M) is meant any compound containing at least one magnesium-halogen bond. The halogen bonded to the magnesium may be fluorine, chlorine, bromine or iodine. Preferably the halogen is chlorine.

Among the halides (M) that may be used to prepare the catalytic solids according to the invention, the following may be cited:

dihalides of commercial type conventionally called "anhydrous" and which are in fact hydrated dihalides containing one molecule and less of water per molecule of dihalide; the "commercial anhydrous" magnesium dichlorides are a typical example of these compounds;

dihalides complexed using various electron donors, such as for example the ammonia complexes, such as $MgCl_2.6NH_3$, $MgCl_2.2NH_3$, and the alcohol complexes, such as $MgCl_2.6CH_3OH$, $MgCl_2.6C_2H_5OH$ and $MgCl_2.6C_3H_7OH$;

hydrated dihalides containing more than one molecule of water per molecule of dihalide, such as $MgCl_2.4H_2O$ and $MgCl_2.2H_2O$;

compounds which, besides the magnesium-halogen bond, contain an inorganic radical attached to the magnesium by means of oxygen, such as a hydroxyl radical, as in $Mg(OH)Cl$ and $Mg(OH)Br$;

compounds which, besides the magnesium-halogen bond (preferably the magnesium-chlorine bond), contain a magnesium-organic radical bond, preferably a magnesium-hydrocarbon radical bond (as defined above), as in $Mg(C_2H_5)Cl$ and $Mg(C_6H_5)Cl$;

hydrolysis products of hydrated magnesium halides (preferably chlorides), insofar as these products still contain magnesium-halogen bonds;

mixed compositions containing halogenated and oxygenated compounds of magnesium. Typical examples of these compositions are magnesium basic halides (preferably chlorides) such as $MgCl_2.MgO.H_2O$, $MgCl_2.3MgO.7H_2O$ and mixtures of two or more of the halogenated magnesium compounds defined above.

Finally, it is well understood that the use of two or more (M) compounds as defined above is also within the scope of the present invention.

Of all the magnesium halides (M) cited above, those that are preferred are the dihalides, and among the latter, the "commercial anhydrous" magnesium dichlorides are most particularly preferred.

The magnesium halide (M) which may be used to prepare the catalytic solids according to the invention is placed in contact with a series of reactants each of which contains at least one element selected among titanium, silicon and aluminium, under conditions such that they eventually yield a catalytic solid exhibiting the above-defined microporosity.

Most frequently, the magnesium halide (M) is first converted to a solid complex (C) containing magnesium, a halogen, titanium and silicon by bringing it into contact with an oxygenated organic compound of titanium (T) and with a polymeric compound of silicon (S) and optionally with an electron donor compound (ED) under general conditions C1 that will be described in detail below. This solid complex (C) is then converted to a microporous catalytic solid by bringing it into contact with at least one compound (H) selected among the halogenated compounds of titanium and silicon and with an organoaluminium compound (A) under general conditions of contact C2 that will also be described in detail below.

1. Nature of the Oxygenated Organic Compound (T)

The oxygenated organic compound of titanium (T) which may be used in the first conversion of the magnesium halide (M) to solid complex (C) may be selected among all the compounds in which any organic radical is attached to titanium by an oxygen link, that is to say all the compounds containing at least one titanium-oxygen-organic radical bond sequence per titanium atom. For ease of preparation, use of the (T) compounds of tetravalent titanium is preferred because they are more often liquid and more often and better soluble than those in which the titanium has a lower valency.

The titanium compounds (T) that may be used can also be compounds containing titanium-oxygen bonds and condensed compounds containing titanium-oxygen-titanium bond sequences insofar as they also contain at least one titanium-oxygen-organic radical bond sequence per molecule.

The organic radical may be saturated or unsaturated, branched, straight-chain or cyclic; it may also be substituted or contain hetero atoms, such as silicon, sulphur, nitrogen or phosphorus, in its chain. It is preferably selected among the hydrocarbon radicals and in particular among the alkyl, alkenyl, cycloalkyl, aryl, aralkyl and alkaryl radicals.

It is preferred to use oxygenated organic compounds whose organic radical is a $C_{2-8}$ n-alkyl radical.

The use of titanium compounds (T) containing several different organic radicals is also within the scope of the invention.

Among the oxygenated titanium compounds (T) the following may be cited:

alkoxides, such as $Ti(OC_2H_5)_4$, $Ti(OnC_3H_7)_4$, $Ti(OnC_4H_9)_4$, $Ti(OnC_5H_{11})_4$, $Ti(OnC_6H_{13})_4$, $Ti(OnC_7H_{15})_4$, and $Ti(OnC_8H_{17})_4$, phenoxides, such as $Ti(OC_6H_5)_4$, oxyalkoxides, such as $TiO(OC_2H_5)_2$, condensed alkoxides, such as $Ti_2O(OiC_3H_7)_6$, carboxylates, such as $Ti(OOCCH_3)_4$, enolates, such as titanium acetylacetonate, as well as esters of polytitanic acids that may be represented by the formula:

(I)

in which $R^1$ to $R^4$ represent organic radicals, which may be the same or different, as defined above, and m is a number preferably such that the ester may be used in liquid form or dissolved. $R^1$ to $R^4$ are preferably identical linear alkyl radicals containing 2 to 8 carbon atoms and m is between 2 and 15, in particular between 2 and 10.

Examples of esters of polytitanic acids corresponding to the formula (I) are the n-butyl, n-hexyl and n-octyl polytitanates (m being 2 to 10).

The best results are obtained when the compounds (T) are selected among the titanium tetraalkoxides.

It goes without saying that the use of several different titanium compounds (T) is also within the scope of the invention.

2. Nature of the Polymeric Compound

The silicon compound (S) which may be used with the titanium compound (T), in the first conversion of the magnesium halide (M) to solid complex (C) is selected among the polymers derived from siloxanes. More particularly, the structure of the compound (S) may be represented by the general formula:

(II)

in which $R^5$ represents a hydrocarbon radical as defined above in connection with the compound (T).

Examples of polysiloxanes having a structure corresponding to that represented by the formula (II) include methyl, ethyl, phenyl and cyclohexyl hydropolysiloxanes, 1,3,5,7-tetramethyltetrahydrocyclotetrasiloxane and 1,3,5,7,9-pentamethylpentahydrocyclopentasiloxane.

The degree of polymerisation (p) of these polysiloxanes is not particularly critical. It may for example be up to about 40. For ease of handling, however, it is preferred to use polymers having a viscosity between about 1 and 100 centistokes. Although the chain end structure of these polymers is not critical either, it is preferred that these ends be rendered inert by the presence of groupings such as trialkylsilyl groups.

Methylhydrogenopolysiloxane is a particularly preferred compound (S), for reasons of accessibility.

3. Nature of the Electron Donor Compound (ED)

Optionally, an electron donor compound (ED) may also be used, in conjunction with the compounds (T) and (S), for the first conversion of magnesium halide (M) to solid complex (C).

Examples of such compounds (ED), which may optionally be used, include carboxylic acids and anhydrides, halides and esters of these acids, alcohols, ethers, ketones, amines, amides, nitriles, aldehydes, alcoholates, phosphines, phosphamides, thioethers and thioesters. Among these compounds, carboxylic acids, their anhydrides, halides and esters, alcohols and ethers are preferred, most especially aliphatic alcohols and ethers containing 2 to 6 carbon atoms and in particular butanol and dibutyl ether.

4. Conditions C1 for the Preparation of the Solid Complex (C)

The magnesium halide (M) may be brought into contact with the compounds (T), (S) and optionally (ED) by any known method leading to the formation of a solid complex (C) containing magnesium, a halogen, titanium and silicon.

To bring about the reaction in which the complex (C) is formed, the various compounds may be employed together or in succession:

in solid form, for example in a stirred suspension in an inert diluent or in the form of dry particles ground together;
in liquid form, when operating conditions permit;
in the form of a solution;
in vapour or gas form.

It is preferred to carry out the reaction in which the complex (C) is formed in a liquid medium. This can be achieved by operating either in the presence of an inert diluent, in which one at least of the reactants is preferably soluble, or in the absence of a diluent under such conditions of temperature and pressure that at least one of the reactants is in the liquid state. As mentioned above, the compound (T) often complies with at least one of these conditions. When an inert diluent is used, all the solvents customarily employed in organic chemistry may be used. Examples of inert diluents are liquid hydrocarbons, optionally halogenated, and silicone oils. It is however preferred to use non-halogenated aliphatic hydrocarbons and cycloaliphatic hydrocarbons and, among these, especially the alkanes and cycloalkanes having 4 to 20 carbon atoms in the molecule such as isobutane, normal pentane, normal hexane, cyclohexane, methylcyclohexane and the dodecanes.

Most frequently, the compound (T), pure or dissolved in an inert diluent and optionally also containing the compound (ED), acts as solvent for the magnesium halide (M) and the compound (S), which is preferably added subsequently to the homogeneous solution so formed, as precipitation agent for the complex (C).

The various compounds contributing to the formation of the complex (C) may be employed at temperatures between $-100°$ and $200°$ C. preferably between $0°$ and $130°$ C. When the compound (S) is added last, this addition preferably takes place at a temperature below $70°$ C. The total contact time is generally between about 10 minutes and about 20 hours, preferably between about 1 hour and about 5 hours.

The relative quantities of the various compounds brought into contact with the magnesium halide (M) to prepare the complex (C) are not critical; these reactants are generally used in the ratios defined below.

The quantity of compound (T) is defined in relation to the quantity of magnesium halide (M) used. It may be between 0.1 and 10 g-at. (gram-atom) of titanium present in the compound (T) per g-at. of magnesium present in the halide (M). Preferably, the Ti/Mg atomic ratio is between 0.5 and 5, the best results having been obtained for values of this ratio between 1 and 3.

The quantity of compound (S) is defined in relation to the quantity of compound (T) used. It may be between 0.01 and 100 g-at. of silicon present in the compound (T). Preferably, the Si/Ti atomic ratio is between 0.1 and 10, the best results having been obtained for values of this ratio between 0.5 and 4.

The quantity of the optional compound (ED), when used, is also defined in relation to the quantity of compound (T) used. It may be between 0.001 and 10 moles of compound (ED) per mole of compound (T) and preferably between 0.01 and 5 moles per mole. The best results have been obtained when 0.1 to 2.5 moles of compound (ED) are used per mole of compound (T) used.

When its preparation is complete, the solid complex (C) is preferably separated from the reaction mixture in which it has been formed and, also preferably, washed with an inert diluent complying with the definitions and limitations mentioned above in relation to the inert diluent that may be used in the course of preparation.

At the end of its preparation, the solid complex (C) which contains magnesium, a halogen, titanium and silicon, after separation and washing, is generally in the form of spheroidal particles of regular granulometry, narrowly spread around the mean value, having a low specific surface area (of the order of 0.5 to 5 $m^2/g$) and not microporous in the sense in which this term is understood according to the invention.

The conversion of this solid complex (C) to a microporous catalytic solid is then carried out, generally according to general conditions (contact conditions C2) and in the presence of compounds (H) and (A) described below.

5. Nature of the Compound (H)

The compound (H) which may be used in the conversion of the solid complex (C) is selected among the halogenated titanium compounds, the halogenated silicon compounds and mixtures of these compounds.

Among the halogenated titanium compounds that may be used the following may be cited:
tetrahalides, such as $TiCl_4$, $TiBr_4$;
halides complexed with various electron donors, such as $TiCl_4.6NH_3$, $TiCl_4.2C_5H_5N$, $TiCl_4.C_4H_8O$;

titanium-alkali metal complex halides such as $K_2TiCl_6$ and $Na_2TiCl_6$;

oxyhalides, such as $TiOCl_2$;

haloalkoxides, such as $Ti(OC_2H_5)_2Cl_2$, $Ti(OC_2H_5)_3Cl$, $Ti(OiC_3H_7)_3Cl$, $Ti(OiC_4H_9)_2Cl_2$, $Ti(OC_2H_5)Br_3$.

Among the halogenated silicon compounds that may be used, the following may be cited:

tetrahalides, such as $SiCl_4$, $SiBr_4$;

halosilanes, such as $HSiCl_3$, $H_2SiCl_2$, $H_3SiCl$;

alkyl- and phenylhalosilanes, such as $H(C_2H_5)SiCl_2$, $H(t-C_4H_9)SiCl_2$, $H(C_6H_5)SiCl_2$, $CH_3SiCl_3$, $(CH_3)_2SiCl_2$, $(C_2H_5)_2SiCl_2$, $(CH_3)_3SiCl$;

the alkoxy- and phenoxyhalosilanes, such as $Si(OCH_3)Cl_3$, $Si(OC_2H_5)Cl_3$, $Si(OC_2H_5)_2Cl_2$, $Si(OC_6H_5)Cl_3$.

Among the compounds listed above, it is preferred to use the titanium and silicon tetrahalides, and most particularly titanium tetrachloride.

6. Nature of the Organoaluminium Compound (A)

The compound (A) for use, with the compound (H), in the conversion of the solid complex (C) may be any organoaluminium compound able to create the above-defined microporosity in the solid complex (C) particles.

The compound (A) is in general an organoaluminium compound whose structure may be represented by the general formula:

$$AlR_n^6 X_{3-n} \qquad (III)$$

in which $R^6$ represents a hydrocarbon radical as defined above in relation to the compound (T), X represents a halogen (fluorine, chlorine, bromine or iodine ) and n is a number such that $0 < n \leq 3$.

Preferably, $R^6$ is selected among the alkyl, alkenyl, cycloalkyl, aryl, arylalkyl and alkylaryl radicals, X is chlorine and n is such that $1 \leq n \leq 3$.

The best results have been obtained with" the organoaluminium compounds represented by the formula (III) in which $R^6$ is a $C_{2-6}$ alkyl radical, n having a value of 1 to 3.

It has been observed that the organoaluminium compounds (A) that are devoid of halogen (n=3) yield catalytic solids that enable polyolefines to be obtained having a relatively narrow molecular weight distribution, whereas the organoaluminium compounds (A) that contain halogen in their molecule yield catalytic solids that enable polyolefines to be obtained having a relatively wide molecular weight distribution.

Examples of organoaluminium compounds (A) that may be used include: $Al(CH_3)_3$, $Al(C_2H_5)_3$, $Al(iC_4H_9)_3$, $Al(C_6H_{11})_3$, $Al(C_2H_5)_2Cl$, $Al(C_2H_5)_2Br$, $Al(iC_4H_9)_2Cl$, $Al(C_2H_5)_{1.5}Cl_{1.5}$, $Al(C_2H_5)Cl_2$, $Al(iC_4H_9)Cl_2$.

Most particularly preferred organoaluminium compounds are triethylaluminium and isobutylaluminium dichloride.

It goes without saying that the use of several different organoaluminium compounds (A) is also within the scope of the invention.

7. Conditions C2 for the Preparation of the Microporous Catalytic Solid

The conversion of the solid complex (C) may be effected by bringing the latter into contact with compounds (H) and (A) under conditions which may be any whatsoever and are not critical, so long as they lead to a microporous catalytic solid containing magnesium, a halogen, titanium, silicon and aluminium.

To carry out this conversion, the compounds (H) and (A) may be employed together or, preferably, in succession, in the forms mentioned for the conditions C1, in relation to the compounds (T), (S) and optional (ED).

It is preferred to carry out the conversion of the complex (C) in a liquid medium. This can be achieved by operating either in the presence of an inert diluent, such as those described for the conditions C1, in which one at least of the reactants is preferably soluble, or in the absence of a diluent in such conditions of temperature and pressure that at least one of the reactants is in the liquid state. The compounds (H) and (A) often comply with at least one of these conditions.

Most frequently, the complex (C), suspended in an inert diluent, has the compound (H) added to it first and the intermediate product obtained, which has a low specific surface area (of the order of 10 m²/g), optionally separated from the medium in which it was prepared and optionally washed with an inert diluent, is subsequently brought into contact, preferably once more in the form of a suspension in an inert diluent, with the compound (A).

The compounds (H) and (A) may be used at temperatures and for contact times similar to those defined for the conditions C1.

The relative quantities of compounds (H) and (A) brought into contact with the complex (C) are not critical so long as the catalytic solid obtained at the end of the preparation process is microporous.

The compounds (H) and (A) are generally used in the ratios defined below.

The quantity of compound (H) is defined in relation to the quantity of titanium present in the complex (C). It may be between 0.01 and 10 g-at. of titanium or silicon present in the compound (H) per g-at. of titanium present in the complex (C). Preferably, the (Ti or Si)/Ti atomic ratio is between 0.1 and 5, the best results being obtained for values of this ratio between 0.5 and 2.

The quantity of compound (A) is defined in relation to the total quantity of titanium present in the solid when it is brought into contact with this compound (if the solid complex (C) is brought into contact with the compound (H) and with the compound (A) simultaneously, this total quantity of titanium present is determined on the solid obtained in parallel, all other conditions being equal, by bringing the solid complex (C) into contact with the compound (H) alone). The quantity of compound (A) may be between 0.1 and 100 g-at. of aluminium per g-at. of titanium present in the said solid. Preferably, the Al/Ti atomic ratio is between 1 and 20, between 2 and 10.

The catalytic solid prepared in this way contains, as stated above, magnesium, a halogen, titanium, partially in trivalent form, silicon, and also organic radicals (particularly hydrocarbyloxy groups, in particular alkoxy groups from the compound T) and aluminium in quantities that are variable as a function of the nature and respective quantities of the various reactants through the involvement of which it was formed. When the catalytic solid is prepared using compounds (A) that are devoid of halogen, a substantial part (at least 50%) of the titanium may be in trivalent form; when the said solid is prepared using compounds (A) that contain halogen, a substantial part (at least 60%) of the titanium may be in tetravalent form.

The catalytic solids according to the invention are insoluble in the alkanes and the cycloalkanes used as diluents. They may be used for polymerisation just as they are obtained, without being separated from the reaction medium in which they were prepared. It is however preferred to separate them from this reaction medium, by any known means, particularly when they have been prepared in the presence of a polar solvent. When the reaction medium is liquid, the separation may for example be by filtration, decantation or centrifuging.

After separation, the catalytic solids may be washed so as to eliminate the excess reactants with which they might still be impregnated. This washing may be done with any inert diluent whatsoever and for example with those that may be used as components of the reaction medium such as alkanes and cycloalkanes. After washing, the catalytic solids may be dried, for example by purging with a stream of dry nitrogen or under vacuum.

The catalytic systems which may be used according to the invention also contain an organometallic compound which serves as an activator. Those used are organometallic compounds of metals of Groups Ia, IIa, IIb, IIIb, and IVb of the Periodic Table (version published in the Kirk-Othmer Encyclopedia of Chemical Technology, second complete revised edition, volume 8, 1965, page 94) such as the organometallic compounds of lithium, magnesium, zinc, aluminium or tin. The best results are obtained with organoaluminium compounds.

The compounds used may be totally alkylated, with linear or branched alkyl chains containing 1 to 20 carbon atoms such as for example n-butyllithium, diethylmagnesium, diethylzinc, tetraethyltin, tetrabutyltin and trialkylaluminium compounds.

Alkylmetallic hydrides in which the alkyl radicals also contain 1 to 20 carbon atoms may also be used, such as diisobutylaluminium hydride and trimethyltin hydride. Also suitable are metal alkyl halides in which the alkyl radicals also contain 1 to 20 carbon atoms such as ethylaluminium sesquichloride, diethylaluminium chloride and diisobutylaluminium chloride.

It is also possible to use organoaluminium compounds obtained by the reaction of trialkylaluminium compounds or dialkylaluminium hydrides whose radicals contain 1 to 20 carbon atoms with diolefines containing 4 to 20 carbon atoms, and more particularly the compounds called isoprenylaluminiums.

The catalytic solids according to the invention are used for the polymerisation of terminally-unsaturated olefines whose molecule contains 2 to 20, and preferably 2 to 6, carbon atoms, such as ethylene, propylene, 1-butene, 4-methyl-1-pentene and 1-hexene. It is also applied in the copolymerisation of these olefines with each other and with diolefines preferably containing 4 to 20 carbon atoms. These diolefines may be non-conjugated aliphatic diolefines such as 1,4-hexadiene, monocyclic diolefines such as 4-vinylcyclohexene, 1,3-divinylcyclohexane, cyclopentadiene or 1,5-cyclooctadiene, alicyclic diolefines having an endocyclic bridge such as dicyclopentadiene or norbornadiene and the conjugated aliphatic diolefines such as butadiene and isoprene.

The polymerisation process according to the invention applies particularly well to the production of ethylene homopolymers and copolymers containing at least 80 molar % and preferably 90 molar % of ethylene.

The polymerisation may be carried out by any known process: in solution or in suspension in a solvent or a hydrocarbon diluent or again in gas phase. For processes in solution or suspension, the solvents or diluents used are analogous to those used in the preparation of the catalytic solid: they are preferably alkanes or cycloalkanes such as isobutane, pentane, hexane, heptane, cyclohexane, methylcyclohexane or mixtures of these. The polymerisation may also be carried out in the monomer or in one of the monomers maintained in the liquid state. It is particularly advantageous to carry out polymerisation processes in which the polymers are generated directly in the form of particles. Preferred among these processes are those in which polymerisation is carried out in suspension in a liquid hydrocarbon diluent under polymerisation conditions which, after separation of the unreacted monomer and diluent, in the presence of the catalyst systems of the invention, yield polymer particles of high apparent specific weight (ASW) and narrow granulometric distribution.

The polymerisation pressure is in general between atmospheric pressure and 100 bars, preferably 50 bars. The temperature is generally selected between 20° and 200° C. It is preferably between 60° and 120° C. so that the polymer may be directly obtained in solid form.

Polymerisation may be carried out continuously or non-continuously.

The organometallic compound and the catalytic solid may be added to the polymerisation medium separately. They may also be brought into contact with each other, at a temperature between −40° and 80° C. for a period up to 2 hours, before being introduced into the polymerisation reactor. They may also be brought into contact in several stages or a part of the organometallic compound may be added before feeding to the reactor or again several different organometallic compounds may be added.

The total quantity of organometallic compound used may vary to a large extent. It is generally between 0.02 and 50 mmoles per $dm^3$ of solvent, diluent or reactor volume and preferably between 0.5 and 2.5 mmoles per $dm^3$.

The quantity of catalytic solid used is determined as a function of its titanium content. It is selected in general so that the concentration is between 0.001 and 2.5 and preferably between 0.01 and 0.25 mg-at. of titanium or zirconium per $dm^3$ of solvent, diluent or reactor volume (mg-at.=milli-gram-atom).

The ratio of the quantities of organometallic compound and catalytic solid are not critical either. It is selected in general so that the organometallic compound/titanium ratio expressed in mole/g-at. is greater than 1 and preferably greater than 10.

The mean molecular weight, and consequently the melt index of the polymers produced according to the process of the invention may be regulated by the addition to the polymerisation medium of one or more molecular weight modification agents such as hydrogen, zinc or diethyl cadmium.

The specific weight of the homopolymers produced by the polymerisation process according to the invention may also be regulated by the addition to the polymerisation medium of an alkoxide of a metal of Groups IVa and Va of the Periodic Table. Polyethylenes may thus be produced having a specific weight intermediate between that of conventional high density polyethylenes and that of polyethylenes prepared by a high pressure process.

Among the alkoxides suitable for use in this regulation, titanium and vanadium alkoxides in which the radicals contain 1 to 20 carbon atoms each are particularly effective. Among them the following may be cited: $Ti(OCH_3)_4$, $Ti(OC_2H_5)_4$, $Ti(OC_4H_9)_4$, $Ti[OCH_2CH(CH_3)_2]_4$, $Ti(OC_8H_{17})_4$ and $Ti(OC_{16}H_{33})_4$.

The polymerisation process according to the invention enables polyolefines to be produced with exceptionally high activity in relation to the quantity of titanium present in the microporous catalytic solid. In the homopolymerisation of ethylene, expressed as grams of polyethylene per g-at. of titanium used, this activity regularly exceeds $2.10^3$. In the most favourable cases, it exceeds $5.10^3$. In all cases it is greatly higher than the level of activities attributed to the catalytic systems of the prior art, including non-microporous catalytic solids prepared without the involvement of the compound (A) (U.S. Pat. No. 4,399,055). This activity is not inhibited by any period of induction.

The content of catalyst residues in the polymers produced by this process is therefore extremely low. More particularly, the content of residual transition metal is excessively low. And, it is the transition metal derivatives that constitute the greatest nuisance in the catalyst residues due to their forming coloured complexes with the phenolic antioxidants customarily used in polyolefines and to the toxic nature of the said metals.

In the process according to the invention, the content of undesirable residues in the polymers is so low that the purification treatment (treatment with alcohol for example), which is obligatory when the content of residual catalyst is high, may be dispensed with, and it is a costly operation in terms of raw materials and energy, tying up a considerable amount of capital.

The polyolefines produced according to the invention are characterised by a remarkable morphology. This is particularly the case with ethylene polymers. The polyolefines obtained according to the invention may be used in all conventional moulding techniques: injection, extrusion, extrusion-blowing, calendering, etc.

The following examples are intended to illustrate the invention.

The meaning of the symbols used in these examples, the units in which the quantities mentioned are expressed and the methods by which some of these quantities are measured are clarified below.

S = specific surface area, expressed in $m^2/g$ and determined by the BET method based on the adsorption of nitrogen.

$V_{por}$ = pore volume for pores of radii less than 200 Å, expressed in ml/g.

ASW = apparent specific weight of the polymer, expressed in $kg/m^3$ and measured by settling.

$\phi_{mean}$ = mean diameter of the polymer particles, expressed in microns (μm).

MI = melt index of the polymer, expressed in g/10 min and measured according to standard ASTM-D 1238-70.

HLMI = high load melt index of the polymer, expressed in g/10 min and measured according to standard ASTM-D 1238-70.

The HLMI/MI ratio is representative of the spread of the distribution of polymer molecular weights. The higher it is, the wider is this distribution.

α = catalyst activity expressed in g of polymer/g Ti.bar$C_2H_4$.h. This activity is determined indirectly by determination of the titanium content in the polymer by X-ray fluorescence.

EXAMPLE 1

1. Preparation of the catalytic solid (a) 38 g of $MgCl_2$ (anhydrous grade from the BDH Company), 200 ml of heptane and 278 ml of $Ti(OC_4H_9)_4$ supplied by Dynamit Nobel (the Ti/Mg atomic ratio is hence about 2) are successively added to a double-walled reactor of 1 liter capacity. The whole is heated to a temperature of 90° C. and maintained at that temperature for 2 hours with stirring.

(b) 100 ml of the liquid complex obtained in (a) above are placed in a double-walled reactor of 200 ml capacity, and heated to 35° C. Then 10.8 ml of a methylhydropolysiloxane (MHPS) sold by DOW CHEMICAL under the name "oil 1107" are added (the Si/Ti atomic ratio is hence about 1) and the mass is maintained at that temperature for 4 hours with stirring.

The solid complex (C) that is obtained is washed 10 times with hexane. Its surface area S is about 1 $m^2/g$.

(c) 50 ml of hexane and 14.7 ml of $TiCl_4$ are added to the solid complex (C) obtained above (atomic ratio of added Ti/Ti already present in solid complex (C) = approximately 0.8). The temperature is raised to 50° C. and maintained at that temperature for 2 hours with stirring. The resulting product is then washed 5 times with hexane and dried in a stream of nitrogen at 60° C. The surface area S of this non-microporous product is only 11 $m^2/g$.

(d) 2 g of the product obtained in stage (c), and 50 ml of hexane are placed in a double-walled reactor of 200 ml capacity, then 7.3 ml of isobutylaluminium dichloride (in the form of a 442 g/l solution in hexane (supplied by Schering)), rediluted in 25 ml of hexane, are added dropwise. The atomic ratio:

aluminium/total Ti contained in the product obtained in stage (c)

is about 5. The mixture is maintained at 20° C. for 1 hour then at 60° C. for 1 hour with stirring.

The catalytic solid obtained is washed 10 times with hexane and dried in order to perform the physical and chemical determinations mentioned below.

| Magnesium content | (g/kg): | 115 | |
|---|---|---|---|
| Chlorine content | (g/kg): | 554 | |
| Titanium content | (g/kg): | 63 | |
| Aluminium content | (g/kg): | 93 | |
| Silicon content | (g/kg): | 13 | |
| Butoxy group content | (g/kg): | 162 | (estimated by difference). |

The surface area S of the catalytic solid is 248 $m^2/g$; 90% of this surface is developed in pores of radii less than 30 Å. The $V_{por}$ of this solid is 0.23 ml/g; the pore volume cumulated in pores of radii less than 50 Å is 0.15 ml/g.

2. Polymerisation

The catalytic solid obtained in 1 is suspended in hexane, the solid content of the suspension being 10 mg per ml. 0.5 ml of this suspension and 0.5 mmole of triethylaluminium are placed in a 1.5 liter autoclave containing 0.5 liter of hexane. The temperature in the autoclave is then raised to about 85° C. Ethylene is introduced at a partial pressure of 10 bars and hydrogen at a partial pressure of 4 bars.

Polymerisation is allowed to proceed for 1 hour with stirring, maintaining the total pressure constant by continuous addition of ethylene. After 1 h, the autoclave is degassed and 65 g of polyethylene (PE) are recovered.

The results of this test are gathered below:

| | |
|---|---|
| α: | 16,700 |
| MI of the PE: | 0.93 |
| HLMI of the PE: | 29 |
| HLMI/MI ratio: | 31 |
| $\phi_{mean}$: | 400 |
| ASW: | 377. |

EXAMPLE 1R

This example is given by way of comparison.

The preparation of the catalytic solid described in part 1 of example 1 above is repeated, except that stage (d) is omitted.

A polymerisation test is performed with 1 ml of a suspension of this product, from stage 1.(c) of example 1, under the conditions described in part 2 of example 1 and 65 g of PE are obtained. The results of this test are gathered below:

| | |
|---|---|
| α: | 11,200 |
| MI of the PE: | 3.08 |
| HLMI of the PE: | 84 |
| HLMI/MI ratio: | 27 |
| $\phi_{mean}$: | 370 |
| ASW: | 371. |

It is hence observed that the microporous catalytic solid of example 1 leads to a polyethylene of wider molecular weight distribution with higher catalyst activity.

EXAMPLE 2

A catalytic solid is prepared as described in part 1 of example 1, except that, in stage (b), 28.2 ml of dibutylether are added as well (the molar ratio dibutylether/Ti present in the liquid complex is about 1). The mass is maintained at 50° C. for 1 hour with stirring, the temperature is brought to 35° C. and then the preparation is continued by adding MHPS as indicated in 1.(b) in example 1.

The catalytic solid obtained is characterised as follows:

S=281 m²/g; 94.3% of this surface is developed in pores of radii less than 50 Å;

$V_{por}$=0.32 ml/g; the pore volume cumulated in pores of radii less than 50 Å is 0.20 ml/g.

It contains the following, in g/kg

| | | |
|---|---|---|
| Magnesium: | 125 | |
| Chlorine: | 600 | |
| Titanium: | 112 | |
| Aluminium: | 28 | |
| Silicon: | 10 | |
| Butoxy groups: | 125 | (estimated by difference). |

A polymerisation test is performed as described in part 2 of example 1 and 71 g of PE are obtained.

The particular results of this test are gathered below:

| | |
|---|---|
| α: | 14,600 |
| MI of the PE: | 0.62 |
| HLMI of the PE: | 23.2 |
| HLMI/MI ratio: | 38 |
| $\phi_{mean}$: | 390 |

-continued

| | |
|---|---|
| ASW: | 362. |

EXAMPLE 3

A catalytic solid is prepared according to the description given in example 2, except that triethylaluminium (3 ml diluted in 10 ml of hexane) is used instead of isobutylaluminium dichloride.

A polymerisation test is carried out with this solid under the general conditions mentioned in part 2 of example 1, the catalytic solid being fed into the autoclave through a two-valve (ethylene and nitrogen) airlock, as briefly described below:

closure of the ethylene valve;
purging of the airlock with nitrogen;
introduction into the airlock of the catalytic solid and 5 ml of hexane;
closure of the nitrogen valve;
introduction into the airlock of nitrogen under high pressure (50 bars)
injection of solid by opening the airlock to the autoclave which is previously heated to and maintained at 85° C.

The results obtained in this polymerisation test, which enabled 87 g of PE to be obtained, are mentioned below:

| | |
|---|---|
| α: | 18,100 |
| MI of the PE: | 2.28 |
| HLMI of the PE: | 45.8 |
| HLMI/MI ratio: | 20 |
| $\phi_{mean}$: | 210 |
| ASW: | 303. |

This catalytic solid has thus enabled a polyethylene to be obtained having a narrow molecular weight distribution, with very high catalyst activity.

Furthermore, an immediate rise in temperature of 3° C. is observed in the autoclave from the start of polymerisation, which demonstrates the absence of an induction period. Analysis of the hexane from the polymerisation mixture by vapour phase chromatography reveals the presence of only 87 ppm of n-butene by volume.

EXAMPLE 2R

This example is given by way of comparison.

A catalytic solid is prepared as indicated in example 3, except that the triethylaluminium treatment is omitted; 0.5 ml of a suspension of this solid in hexane is used to perform a polymerisation test according to the conditions of example 3. 54 g of PE are obtained.

The particular results of this test are recorded below:

| | |
|---|---|
| α: | 11,500 |
| MI of the PE: | 1.46 |
| HLMI of the PE: | 34.2 |
| HLMI/MI ratio: | 23 |
| $\phi_{mean}$: | 190 |
| ASW: | 327. |

The observed rise in temperature in the autoclave is only 1° C. after 4 minutes, which demonstrates the existence of an induction period. Analysis of the hexane from the polymerisation process by vapour phase chromatography reveals the presence of 1092 ppm of n-butene.

EXAMPLE 4

A catalytic solid is prepared by the operating method described in part 1 of example 1, except that the liquid complex in stage (a) is prepared in the presence of a supplementary quantity of dibutyl ether such that the molar ratio of dibutyl ether/Ti present in the preparation medium is about 1.

A polymerisation test is performed in the presence of 0.7 ml of a suspension of the resulting catalytic solid in hexane as described in example 3. 75 g of PE are obtained.

The particular results of this test are recorded below:

| | |
|---|---|
| $\alpha$: | 26,300 |
| MI of the PE: | 0.73 |
| HLMI of the PE: | 22.8 |
| HLMI/MI ratio: | 31 |
| $\phi_{mean}$: | 190 |
| ASW: | 310. |

An immediate rise in temperature of 7° C. is observed in the autoclave from the start of polymerisation, which demonstrates the total absence of an induction period.

EXAMPLE 5

A catalytic solid is prepared according to the description given in example 1, except that the liquid complex of stage (a) is prepared in the presence of a quantity of butanol such that the molar ratio of butanol/Ti present in the preparation medium for the complex is about 0.1 and triethylaluminium is used instead of isobutylaluminium dichloride (as in example 3).

The catalytic solid obtained contains 102 g/kg of magnesium, 386 g/kg of chlorine, 90 g/kg of titanium, 62 g/kg of aluminium and 2.5 g/kg of silicon.

Its S is 405 m$^2$/g; 96% of this surface is developed in pores of radii less than 50 Å and 93% in pores of radii less than 30 Å. The $V_{por}$ of this solid is 0.27 ml/g; the pore volume cumulated in pores of radii less than 50 Å is 0.18 ml/g.

A polymerisation test is performed in the presence of 0.3 ml of a suspension in hexane of the catalytic solid thus obtained, as described in part 2 of example 1 and 94 g of PE are obtained. The results of this test are gathered below:

| | |
|---|---|
| $\alpha$: | 25,000 |
| MI of the PE: | 3,12 |
| HLMI of the PE: | 84.5 |
| HLMI/MI ratio: | 27 |
| $\phi_{mean}$: | 480 |
| ASW: | 303. |

We claim:

1. In a process for the preparation of a catalytic solid by reacting effective amounts of a magnesium halide (M) with an oxygenated organic compound of titanium (T) to which is added a polymeric compound of silicon (S) to form a solid complex (C) containing magnesium, a halogen, titanium, and silicon; the improvement comprising converting the solid complex (C) into a microporous catalytic solid containing aluminum by contacting the solid complex (C) with a compound (H) selected from the group consisting of the halogenated compounds of titanium and silicon, and further contacting the solid complex (C) with a supplemental organoaluminum compound (A) of the general formula $$AlR_n^6X_{3-n}$$

wherein R$^6$ is a hydrocarbon radical, X is a halogen and $0<n\leq 3$.

2. In a process for the preparation of a catalytic solid by reacting effective amounts of a magnesium halide (M) with an oxygenated organic compound of titanium (T) to form a solution to which is added a precipitating agent selected from a polymeric compound of silicon (S) to form a solid complex (C) containing magnesium, a halogen, titanium, and silicon; the improvement comprising converting the solid complex (C) into a microporous catalytic solid by contacting the solid complex (C) with a compound (H) selected from the group consisting of the halogenated compounds of titanium and silicon, and further contacting the solid complex (C) with a supplemental organoaluminum compound (A) and separating said microporous catalytic solid from said solution.

3. The process for the preparation of a catalytic solid according to claim 2, wherein more than 60% of its specific surface area is developed in pores of radius less than 50 Å.

4. The process for the preparation of a catalytic solid according to claim 2, wherein a fraction comprising at least 50% of its porosity, for pore radius less than 200 Å, is developed in pores of radii less than 50 Å.

5. The process for the preparation of a catalytic solid according to claim 1, wherein the magnesium halide (M) is a dihalide.

6. The process for the preparation of a catalytic solid according to claim 1, wherein the organic oxygenated compound (T) is selected from among the esters of polytitanic acids.

7. The process for the preparation of a catalytic solid according to claim 6, wherein the organic oxygenated compound (T) is selected from among the titanium tetraalkoxides.

8. The process for the preparation of a catalytic solid according to claim 1, wherein the structure of the polymeric compound of silicon (S) is represented by the general formula

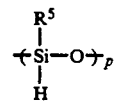

in which R$^5$ represents a hydrocarbon radical containing 1 to 20 carbon atoms and p is the mean degree of polymerisation.

9. The process for the preparation of a catalytic solid according to claim 1, wherein the solid complex (C) includes an electron donor compound (ED).

10. The process for the preparation of a catalytic solid according to claim 9, wherein the electron donor compound (ED) is an aliphatic ether containing 2 to 6 carbon atoms.

11. The process for the preparation of a catalytic solid according to claim 9, wherein the electron donor compound (ED) is an aliphatic alcohol containing 2 to 6 carbon atoms.

12. The process for the preparation of a catalytic solid according to claim 1, wherein the halogenated compound (H) is selected from among titanium and silicon tetrahalides.

13. The process for the preparation of a catalytic solid according to claim 1, wherein the structure of the organoaluminum compound (A) corresponds to the general formula:

$$AaR_n^6X_{3-n}$$

in which $R^6$ represents a hydrocarbon radical containing 1 to 20 carbon atoms, X represents a halogen and n is a number such that $1 < n \leq 3$.

14. The process for the preparation of a catalytic solid according to claim 13, wherein the organoaluminum compound (A) is a trialkyl aluminum.

15. The process for the preparation of a catalytic solid according to claim 13, wherein the organoaluminum compound (A) is an alkyl aluminium dichloride.

16. In a catalytic solid prepared by reacting effective amounts of a magnesium halide (M) with an oxygenated organic compound of titanium (T) to which is added a polymeric compound of silicon (S) to form a solid complex (C) containing magnesium, a halogen, titanium, and silicon; the improvement comprising converting the solid complex (C) into a microporous catalytic solid containing aluminum by contacting the solid complex (C) with a compound (H) selected from the group consisting of the halogenated compounds of titanium and silicon, and further contacting the solid complex (C) with a supplemental organoaluminum compound (A) of the general formula $$AlR_n^6X_{3-n}$$

wherein $R^6$ is a hydrocarbon radical, X is a halogen and $0 < n \leq 3$.

17. In a catalytic solid prepared by reacting effective amounts of a magnesium halide (M) with an oxygenated organic compound of titanium (T) to form a solution to which is added a precipitating agent selected from a polymeric compound of silicon (S) to form a solid complex (C) containing magnesium, a halogen, titanium, and silicon; the improvement comprising converting the solid complex (C) into a microporous catalytic solid by contacting the solid complex (C) with a compound (H) selected from the group consisting of the halogenated compounds of titanium and silicon, and further contacting the solid complex (C) with a supplemental organoaluminum compound (A) and separating said microporous catalytic solid from said solution.

18. The catalytic solid according to claim 17, wherein more than 60% of its specific surface area is developed in pores of radius less than 50 Å.

19. The catalytic solid according to claim 17, wherein a fraction comprising at least 50% of its porosity, for pore radius less than 200 Å, is developed in pores of radii less than 50 Å.

20. The catalytic solid according to claim 16, wherein the magnesium halide (M) is a dihalide.

21. The catalytic solid according to claim 16, wherein the organic oxygenated compound (T) is selected from among the esters of polytitanic acids.

22. The catalytic solid according to claim 21, wherein the organic oxygenated compound (T) is selected from among the titanium tetraalkoxides.

23. The catalytic solid according to claim 16, wherein the structure of the polymeric compound of silicon (S) is represented by the general formula $$\left( \begin{array}{c} R^5 \\ | \\ Si-O \\ | \\ H \end{array} \right)_p$$

in which $R^5$ represents a hydrocarbon radical containing 1 to 20 carbon atoms and p is the mean degree of polymerisation.

24. The catalytic solid according to claim 16, wherein the solid complex (C) includes an electron donor compound (ED).

25. The catalytic solid according to claim 24, wherein the electron donor compound (ED) is an aliphatic ether containing 2 to 6 carbon atoms.

26. The catalytic solid according to claim 24, wherein the electron donor compound (ED) is an aliphatic alcohol containing 2 to 6 carbon atoms.

27. The catalytic solid according to claim 16, wherein the halogenated compound (H) is selected from among titanium and silicon tetrahalides.

28. The catalytic solid according to claim 16, wherein the structure of the organoaluminum compound (A) corresponds to the general formula:

$$AaR_n^6X_{3-n}$$

in which $R^6$ represents a hydrocarbon radical containing 1 to 20 carbon atoms, X represents a halogen and n is a number such that $1 < n \leq 3$.

29. The catalytic solid according to claim 28, wherein the organoaluminum compound (A) is a trialkyl aluminum.

30. The catalytic solid according to claim 28, wherein the organoaluminum compound (A) is an alkyl aluminium dichloride.

* * * * *